US012026455B1

(12) United States Patent
Estes et al.

(10) Patent No.: US 12,026,455 B1
(45) Date of Patent: *Jul. 2, 2024

(54) SYSTEMS AND METHODS FOR CONSTRUCTION, MAINTENANCE, AND IMPROVEMENT OF KNOWLEDGE REPRESENTATIONS

(71) Applicant: Digital Reasoning Systems, Inc., Franklin, TN (US)

(72) Inventors: Timothy Wayne Estes, Nashville, TN (US); James Johnson Gardner, Austin, TX (US); Matthew Russell, Franklin, TN (US); Phillip Daniel Michalak, Spring Hill, TN (US)

(73) Assignee: Digital Reasoning Systems, Inc., Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/187,253

(22) Filed: Mar. 21, 2023

Related U.S. Application Data

(63) Continuation of application No. 17/135,218, filed on Dec. 28, 2020, now Pat. No. 11,640,494, which is a
(Continued)

(51) Int. Cl.
*G06F 40/169* (2020.01)
*G06F 40/211* (2020.01)
(Continued)

(52) U.S. Cl.
CPC .......... *G06F 40/169* (2020.01); *G06F 40/211* (2020.01); *G06F 40/30* (2020.01); *G06F 40/40* (2020.01); *G06Q 10/107* (2013.01)

(58) Field of Classification Search
CPC ...... G06F 40/169; G06F 40/40; G06F 40/211; G06F 40/30; G06F 17/30958;
(Continued)

(56) References Cited

U.S. PATENT DOCUMENTS 5,056,021 A 10/1991 Ausborn
7,058,625 B2 6/2006 Bossemeyer, Jr. et al.
(Continued)

FOREIGN PATENT DOCUMENTS

WO 2009051987 4/2009
WO 2015006206 1/2015
WO 2015009620 1/2015

OTHER PUBLICATIONS

Jones, C.E. et al., "Estimating the annotation error rate of curated GO database sequence annotations," BMC Bioinformatics, 2007, vol. 8, 9 pages.
(Continued)

*Primary Examiner* — Abdelali Serrou
(74) *Attorney, Agent, or Firm* — Meunier Carlin & Curfman LLC

(57) ABSTRACT

In one aspect, the present disclosure relates to a method which, in one example embodiment, can include reading text data corresponding to messages and creating semantic annotations to the text data to generate annotated messages. Creating the semantic annotations can include generating, at least in part by at least one trained statistical language model, predictive labels as annotations corresponding to language patterns associated with the text data. The method further includes aggregating the annotated messages and storing information associated with the aggregated annotated messages in a message store, and performing, based on information from the message store and associated with the messages, global analytics functions. The global analytics functions can include identifying an annotation error in the created semantic annotations, updating the respective semantic annotation to correct the annotation error, to form an updated semantic annotation, and back-propagating the
(Continued)

updated semantic annotation into training data for further language model training.

1 Claim, 9 Drawing Sheets

Related U.S. Application Data continuation of application No. 15/640,861, filed on Jul. 3, 2017, now Pat. No. 10,878,184, which is a continuation of application No. 15/154,951, filed on May 14, 2016, now Pat. No. 9,697,192, which is a continuation of application No. 14/705,899, filed on May 6, 2015, now Pat. No. 9,348,815, which is a continuation-in-part of application No. 14/320,566, filed on Jun. 30, 2014, now abandoned.

(60) Provisional application No. 62/017,937, filed on Jun. 27, 2014, provisional application No. 61/841,071, filed on Jun. 28, 2013, provisional application No. 61/841,054, filed on Jun. 28, 2013.

(51) Int. Cl.
*G06F 40/30* (2020.01)
*G06F 40/40* (2020.01)
*G06Q 10/107* (2023.01)

(58) Field of Classification Search
CPC .... G06F 17/271; G06F 17/277; G06F 17/274; G06F 17/2775; G06F 17/30312; G06F 17/30654; G06F 17/30684; G06F 17/2785; G06F 17/30991; G06F 17/30994; G06F 17/2247; G06F 17/241; G06F 17/28; G06F 17/30619; G06F 17/30643; G06F 17/30657; G06F 17/30917; G06F 17/30336; G06F 17/30539; G06F 17/30554; G06F 17/30702; G06F 17/3071; G06F 17/30722; G06F 17/30731; G06F 17/30961; G06F 8/20; G06F 8/74; G06Q 10/107
See application file for complete search history.

(56) References Cited

U.S. PATENT DOCUMENTS

| | | | |
|---|---|---|---|
| 7,249,117 B2 | 7/2007 | Estes | |
| 7,366,655 B1 | 4/2008 | Gupta et al. | |
| 7,444,403 B1 | 10/2008 | Packer et al. | |
| 7,606,714 B2 | 10/2009 | Williams et al. | |
| 7,627,466 B2 | 12/2009 | Ramsey et al. | |
| 7,634,398 B2 | 12/2009 | Knoll et al. | |
| 7,757,163 B2 | 7/2010 | Doganata et al. | |
| 7,835,911 B2 | 11/2010 | Balchandran et al. | |
| 7,860,881 B2 | 12/2010 | Haselden et al. | |
| 7,882,055 B2 | 2/2011 | Estes | |
| 7,958,164 B2 | 6/2011 | Ivanov et al. | |
| 7,996,211 B2 | 8/2011 | Cao et al. | |
| 8,015,143 B2 | 9/2011 | Estes | |
| 8,036,997 B2 | 10/2011 | Garrity et al. | |
| 8,090,621 B1 | 1/2012 | Chakrabarti et al. | |
| 8,140,323 B2 | 3/2012 | Johnson et al. | |
| 8,145,562 B2 | 3/2012 | Wasserblat et al. | |
| 8,145,708 B2 | 3/2012 | Biggs et al. | |
| 8,204,738 B2 | 6/2012 | Skuratovsky | |
| 8,285,725 B2 | 10/2012 | Bayliss | |
| 8,290,968 B2 | 10/2012 | Jonas | |
| 8,352,388 B2 | 1/2013 | Estes | |
| 8,370,355 B2 | 2/2013 | Harger et al. | |
| 8,423,525 B2 | 4/2013 | Jonas | |
| 8,423,538 B1 | 4/2013 | Sadikov et al. | |
| 8,429,179 B1 | 4/2013 | Mirhaji | |
| 8,433,558 B2 | 4/2013 | Bangalore et al. | |
| 8,457,950 B1 | 6/2013 | Gardner et al. | |
| 8,510,323 B2 | 8/2013 | Eshwar et al. | |
| 8,588,825 B2 | 11/2013 | Jonsson et al. | |
| 8,612,261 B1 | 12/2013 | Swanson et al. | |
| 8,620,836 B2 | 12/2013 | Ghani et al. | |
| 8,631,495 B2 | 1/2014 | Judge | |
| 8,706,491 B2 | 4/2014 | Chelba et al. | |
| 8,768,307 B1 | 7/2014 | Heins et al. | |
| 8,775,356 B1* | 7/2014 | Chen | G06F 16/3338 706/50 |
| 8,788,657 B2 | 7/2014 | Hodges et al. | |
| 8,838,834 B2 | 9/2014 | Reynolds | |
| 8,850,536 B2 | 9/2014 | Liberman et al. | |
| 8,873,813 B2 | 10/2014 | Tadayon et al. | |
| 8,972,511 B2 | 3/2015 | Freire et al. | |
| 9,009,029 B1 | 4/2015 | Michalak et al. | |
| 9,058,317 B1 | 6/2015 | Gardner et al. | |
| 9,195,646 B2 | 11/2015 | Tsuchida et al. | |
| 9,230,280 B1 | 1/2016 | Maag et al. | |
| 9,311,301 B1 | 4/2016 | Balluru et al. | |
| 9,535,899 B2* | 1/2017 | Allen | G06F 40/30 |
| 9,535,902 B1 | 1/2017 | Michalak et al. | |
| 10,630,560 B2 | 4/2020 | Erkinbeck et al. | |
| 2003/0212544 A1 | 11/2003 | Acero et al. | |
| 2005/0039107 A1 | 2/2005 | Hander et al. | |
| 2005/0108001 A1 | 5/2005 | Aarskog | |
| 2006/0074634 A1 | 4/2006 | Gao et al. | |
| 2006/0143175 A1 | 6/2006 | Ukrainczyk et al. | |
| 2006/0184526 A1 | 8/2006 | Bossemeyer, Jr. et al. | |
| 2007/0011649 A1 | 1/2007 | Venolia | |
| 2007/0150802 A1 | 6/2007 | Wan et al. | |
| 2008/0270120 A1 | 10/2008 | Pestian et al. | |
| 2008/0320010 A1 | 12/2008 | Li et al. | |
| 2009/0055761 A1 | 2/2009 | Basson et al. | |
| 2009/0203390 A1 | 8/2009 | Bradbury et al. | |
| 2009/0259499 A1 | 10/2009 | Bohjwani et al. | |
| 2009/0282012 A1 | 11/2009 | Konig et al. | |
| 2009/0326919 A1 | 12/2009 | Bean | |
| 2010/0030738 A1 | 2/2010 | Geer | |
| 2010/0205123 A1 | 8/2010 | Sculley et al. | |
| 2010/0211924 A1* | 8/2010 | Begel | G06F 16/904 707/E17.069 |
| 2010/0227301 A1 | 9/2010 | Yu et al. | |
| 2010/0241507 A1 | 9/2010 | Quinn et al. | |
| 2010/0250598 A1 | 9/2010 | Brauer et al. | |
| 2011/0071933 A1 | 3/2011 | Daly et al. | |
| 2011/0196642 A1 | 8/2011 | Newcomb | |
| 2011/0218822 A1 | 9/2011 | Buisman et al. | |
| 2011/0261807 A1 | 10/2011 | Walters et al. | |
| 2012/0011428 A1* | 1/2012 | Chisholm | G06F 40/169 715/230 |
| 2012/0078613 A1* | 3/2012 | Kandekar | G06F 3/04842 704/9 |
| 2012/0143649 A1 | 6/2012 | Aubertin | |
| 2012/0215808 A1 | 8/2012 | Allen et al. | |
| 2013/0013291 A1 | 1/2013 | Bullock et al. | |
| 2013/0124435 A1 | 5/2013 | Estes | |
| 2013/0254739 A1* | 9/2013 | Chen | G06F 40/30 717/102 |
| 2013/0325442 A1 | 12/2013 | Dahlmeier et al. | |
| 2014/0019122 A1 | 1/2014 | New | |
| 2014/0025372 A1 | 1/2014 | Tamura et al. | |
| 2014/0067363 A1 | 3/2014 | Ogren et al. | |
| 2014/0136188 A1 | 5/2014 | Wroczynski et al. | |
| 2014/0142922 A1 | 5/2014 | Liang et al. | |
| 2014/0180676 A1 | 6/2014 | Hillard et al. | |
| 2014/0180728 A1 | 6/2014 | Biddle et al. | |
| 2014/0283055 A1 | 9/2014 | Zahran | |
| 2015/0067833 A1 | 3/2015 | Verma et al. | |
| 2015/0169522 A1 | 6/2015 | Logan et al. | |
| 2015/0172308 A1* | 6/2015 | Borohovski | G06F 40/143 726/25 |
| 2015/0199333 A1 | 7/2015 | Nekhay | |
| 2015/0242856 A1 | 8/2015 | Dhurandhar et al. | |

(56) References Cited

U.S. PATENT DOCUMENTS

| | | |
|---|---|---|
| 2016/0170952 A1 | 6/2016 | Carrier et al. |
| 2016/0182556 A1 | 6/2016 | Tatourian et al. |
| 2017/0161263 A1 | 6/2017 | Gordon et al. |

OTHER PUBLICATIONS

Michelson, M. et al., "Mining the Heterogeneous Transformations between Data Sources to Aid Record Linkage," Proceedings of the International Conference on Artificial Intelligence (ICAI), 2009, pp. 422-428.

Singh, S. et al., "Large-Scale Cross-Document Coreference Using Distributed Inference and Hierarchical Models," Proceedings of the 49th Annual Meeting of the Association for Computational Linguistics, 2011, pp. 793-803.

Wick, M. et al., "A Discriminative Hierarchical Model for Fast Coreference at Large Scale," Proceedings of the 50th Annual Meeting of the Association for Computational Linguistics, 2012, pp. 379-388.

"Cosine Similarity," available online at: http://en.wikipedia.org/wiki/Cosine_similarity: accessed Mar. 6, 2015.

"Freebase," available online at: http://www.freebase.com; accessed Mar. 4, 2015.

Gyorgy Dan et al., "Power-law Revisited: Large Scale Measurement Study of P2P Content Popularity," IPTPS; Apr. 2010.

Singh, S., et al. "Wikilinks: A Large-Scale Cross-Document Coreference Corpus Labeled via Links to Wikipedia;" Oct. 2012.

"Wiki-links Data," available online at: http://code.google.com/piwiki-links/downloads/list; accessed Mar. 4, 2015.

"Zipfs Law," available online at http://en.wikipedia.org/wiki/Zipfs_law; accessed Mar. 4, 2015.

* cited by examiner

SYSTEMS AND METHODS FOR CONSTRUCTION, MAINTENANCE, AND IMPROVEMENT OF KNOWLEDGE REPRESENTATIONS

CROSS-REFERENCE TO RELATED APPLICATIONS

This Application is a continuation of, and claims benefit under 35 U.S.C. § 120 of, U.S. patent application Ser. No. 17/135,218 filed Dec. 28, 2020. U.S. patent application Ser. No. 17/135,218 is a continuation of, and claims benefit under 35 U.S.C. § 120 of, U.S. patent application Ser. No. 15/640,861 filed Jul. 3, 2017. U.S. patent application Ser. No. 15/640,861 is a continuation of, and claims benefit under 35 U.S.C. § 120 of, U.S. patent application Ser. No. 15/154,951 filed May 14, 2016. U.S. patent application Ser. No. 15/154,951 is a continuation of, and claims benefit under 35 U.S.C. § 120 of, U.S. Patent 10 application Ser. No. 14/705,899 filed May 6, 2015. U.S. patent application Ser. No. 14/705,899 is a continuation-in-part of, and claims benefit under 35 U.S.C. § 120 of, U.S. patent application Ser. No. 14/320,566 filed Jun. 30, 2014. U.S. patent application Ser. No. 14/320,566 claims priority to and benefit under 35 U.S.C. § 119(e) of U.S. Provisional Patent Application Ser. No. 61/841,071 filed Jun. 28, 2013, U.S. Provisional Patent Application 15 Ser. No. 61/841,054 filed Jun. 28, 2013, and U.S. Provisional Patent Application Ser. No. 62/017,937 filed Jun. 27, 2014. These above-mentioned U.S. Patent Applications are hereby incorporated by reference herein in their entireties as if fully set forth below.

BACKGROUND

The growth of unstructured data can create a widening understanding gap within enterprises across all industries. Unstructured data may grow more rapidly than structured data, which can create additional issues for enterprises because unstructured data can be human-generated, pervasive, fluid, and imprecise. Some difficulties in deriving critical, actionable information from big data can be exemplified in recent financial scandals, where although indications of problematic behavior were within the archived human communications data of the financial industry, surrounding mountains of innocuous communications prevented timely action to address the growing risks. Similar difficulties can be faced by the intelligence community, where thousands of reports are received daily, but a limited ability to make meaningful connections between disparate sources of information may prevent timely responses to evolving situations. It is with respect to these and other considerations that aspects of the present disclosure are presented herein.

SUMMARY

In one aspect, the present disclosure relates to a computer-implemented method. In one embodiment, the method includes reading text data corresponding to one or more messages and creating one or more semantic annotations to the text data to generate one or more annotated messages. Creating the one or more semantic annotations can include generating, at least in part by at least one trained statistical language model, one or more predictive labels as annotations corresponding to language patterns associated with the text data. The method can further include aggregating the one or more annotated messages and storing information associated with the aggregated one or more annotated messages in a message store, and performing, based on information from the message store and associated with the one or more messages, one or more global analytics functions. The one or more global analytics functions can include identifying an annotation error in the created semantic annotations, updating the respective semantic annotation to correct the annotation error, to form an updated semantic annotation, and back-propagating the updated semantic annotation into training data for further language model training. The back-propagating can include forming updated training data, including the updated semantic annotation, for additional training of the at least one statistical language model.

In another aspect, the present disclosure relates to a system. In one embodiment, the system includes one or more processors and a memory device that is coupled to the one or more processors and stores instructions which, when executed by the one or more processors, cause the system to perform specific functions. The specific functions include reading text data corresponding to one or more messages and creating one or more semantic annotations to the text data to generate one or more annotated messages. Creating the one or more semantic annotations can include generating, at least in part by at least one trained statistical language model, one or more predictive labels as annotations corresponding to language patterns associated with the text data. The specific functions can also include aggregating the one or more annotated messages and storing information associated with the aggregated one or more annotated messages in a message store, and performing, based on information from the message store and associated with the one or more messages, one or more global analytics functions. The one or more global analytics functions can include identifying an annotation error in the created semantic annotations, and updating the respective semantic annotation to correct the annotation error, to form an updated semantic annotation. The global analytics functions can also include back-propagating the updated semantic annotation into training data for further language model training. The back-propagating can include forming updated training data, that includes the updated semantic annotation, for additional training of the at least one statistical language model.

In another aspect, the present disclosure relates to a non-transitory computer-readable medium. In one embodiment, the computer-readable medium stores instructions which, when executed by one or more processors, cause one or more computers to perform functions that include reading text data corresponding to one or more messages, and creating one or more semantic annotations to the text data to generate one or more annotated messages. Creating the one or more semantic annotations can include generating, at least in part by at least one trained statistical language model, one or more predictive labels as annotations corresponding to language patterns associated with the text data. The stored instructions, when executed by the one or more processors, can cause the one or more computers to further perform functions that include aggregating the one or more annotated messages and storing information associated with the aggregated one or more annotated messages in a message store, and performing, based on information from the message store and associated with the one or more messages, one or more global analytics functions. The one or more global analytics functions can include identifying an annotation error in the created semantic annotations, updating the respective semantic annotation to correct the annotation error, to form an updated semantic annotation, and back-propagating the updated semantic annotation into training data for further language model training. The back-propagating can include forming updated training data, that includes the updated semantic annotation, for additional training of the at least one statistical language model.

BRIEF DESCRIPTION OF THE DRAWINGS

Reference will now be made to the accompanying drawings, which are not necessarily drawn to scale.

DETAILED DESCRIPTION

Figure 1:
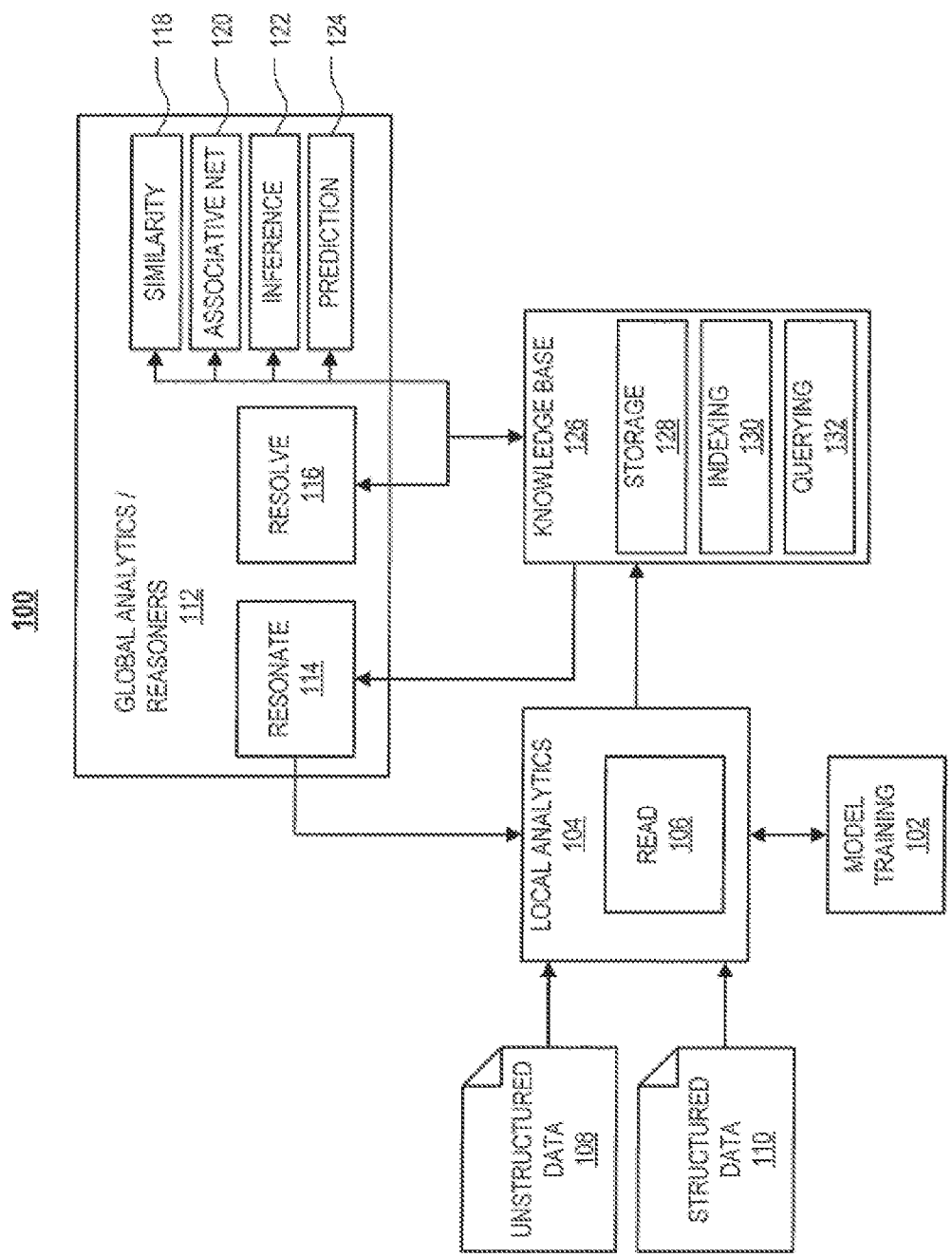
FIG. 1 is a diagram illustrating a system according to one example embodiment of the present disclosure.

The following detailed description is directed to computing systems and methods for performing functions that may include the construction, maintenance, and improvement of knowledge representations. Although example embodiments of the present disclosure are explained in detail, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Moreover, titles or subtitles may be used in this specification for the convenience of a reader, which shall have no influence on the scope of the present disclosure.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose.

The following provides non-limiting definitions of some terms used herein in describing certain aspects of the present disclosure, for convenience of the reader.

As used herein, an "agent" may refer to an autonomous program module configured to perform specific tasks on behalf of a host and without requiring the interaction of a user.

As used herein, an "aggregate" may refer to a collection defined by users or algorithms of pointers and values, including sets of other primitives such as entities, concepts, relationships, etc.

As used herein, an "application" may refer to an assembly of reasoning APIs, user experience, and business objectives and constraints.

As used herein, a "category" may refer to a labeled set (or aggregate) of concepts or relationships.

As used herein, a "concept" may consist of an aggregate of either entities, predicates, or modifiers.

As used herein, a "contextual feature" can be a feature that captures the context surrounding a mention. A contextual feature may comprise extractor tags and features at the word level in a sentence.

As used herein, "coreference resolution" or "entity resolution" may refer to a process of determining whether two expressions (or "mentions") in natural language refer to the same entity.

As used herein, a "coreference chain" (or "coref chain") may refer to one or more textual references to an entity.

As used herein, an "entity" may refer to a set or aggregate of mentions that constitute an unambiguous identity of a person, group, thing, or idea. An entity may be a group of coreferent "sub entities", which may also be referred to as a "concept".

As used herein, a "feature" may refer to a value derived from examination of the context of a concept, relationships, and messages. A feature can be explicitly in the message or inferred through analytics.

As used herein, a "feature vector" may refer to an n-dimensional vector of features, such as numerical features, that can represent an element (or mention). Some machine learning processes described herein may utilize numerical representation of objects to facilitate processing and statistical analysis.

As used herein, "local entity" may refer to a group of in-document coreferent mentions, which may also be referred to as a local coreference chain.

As used herein, a "mention" may refer to a reference to a value in a position in a message that has been processed. "Mention" as used herein may additionally or alternatively refer to a data object that represents a chunk, which can contain book-keeping info (token start, token end, etc.)
and features that aid in resolution.

As used herein, a "message" may refer to an ordered collection of values.

As used herein, a "modifier" may provide additional determination and specification of the entity, predicate, or relationship. A modifier may be necessarily bound in a relationship.

As used herein, a "non-contextual feature" may refer to features which are constant for a given word regardless of the context. Non-contextual feature vectors may comprise tokenizer output and features at the character level for a given word.

As used herein, a "predicate" may refer to the type of action or activity and reference to that activity independent of the subjects or objects of that activity.

As used herein, "reasoning" may refer to the use or manipulation of concepts and relationships to answer end user questions. Reasoning may be primitive (atomic) or complex (orchestrated to support a specific business use case).

As used herein, a "relationship" may refer to an n-tuple of concepts or relationships (i.e. relationships can be recursive). A relationship can have a value as a label.

As used herein, "resolution" may refer to the determination of a set or all references to create concepts or relationships.

As used herein, "space" and "time" may refer to ranges that may constrain relationships. Inherently, space and time may be of limited precision and can be implemented with different basic units of measure.

As used herein, "structured data" may refer to attribute/value pairs and relationships with pre-defined meaning.

As used herein, "sub entity" may refer to a group of coreferent "local entities". A sub entity may also be the atomic unit of input for iterative global coreference processes as described in the present disclosure.

As used herein, "super entity" may refer a coarse-grained cluster. Person mentions can be part of a larger 'person' super entity. As a further example, all mentions belonging to a 'politics' category can be part of one big super entity. Super entities can be used for minimizing a search space.

In the following detailed description, references are made to the accompanying drawings that form a part hereof and that show, by way of illustration, specific embodiments or examples. In referring to the drawings, like numerals represent like elements throughout the several figures.

Some fictitious names such as "Roger Guta", "Raj Mojihan", "Gallot Company", "Proffett & Gambrel", "William Schultz", "Kinsor & Company", "John Smith", "Princetown University" that are used throughout the present disclosure are intended for illustration purposes only and are not intended to refer to any specific real-world persons or entities.

Some instances of specific terms used herein may be partially capitalized (e.g., "Resonate", "Knowledge Graph"). Such partial capitalization is intended for the convenience of the reader and/or to distinguish the features, functions, or concepts a particular term may represent in some specific embodiments of the present disclosure. Intentional mention of a specific proprietary or commercially-used name may be signified herein by all capitalized characters (e.g., JAVASCRIPT).

In some embodiments, the present disclosure can provide for implementing analytics using both supervised and unsupervised machine learning techniques. Supervised mathematical models can encode a variety of different data "features" and associated weight information, which can be stored in a data file and used to reconstruct a model at run-time. The features utilized by these models may be determined by linguists and developers, and may be fixed at model training time. Models can be retrained at any time, but retraining may be done more infrequently once models reach certain levels of accuracy.

Such approaches can be used to capture linguistic phenomena by utilizing the models to label sequences of characters/tokens/elements with the correct linguistic information that a model was created to predict. According to some embodiments of the present disclosure, a supervised approach can comprise two phases: a training phase to identify those features that are significant for determining the correct label sequencing implemented by that model, and a run-time labeling phase that employs inference algorithms to assign attributes to the text being processed.

Training can be performed by passing annotated data to a machine-learning training algorithm that creates an appropriate model. This data can be represented as vectors of features. Such machine-learning training algorithms can learn the weights of features and persist them in a model so that inference algorithms can use the model to predict a correct label sequence to assign to the terms as they are being processed.

The use of statistical models can provide for a degree of language independence because the same underlying algorithms can be used to predict correct labeling sequences; the process may slightly differ just in using a different set of models. For each language, a new model can be created for each machine learning function, using the language to identify significant features important to that model.

Figure 2:
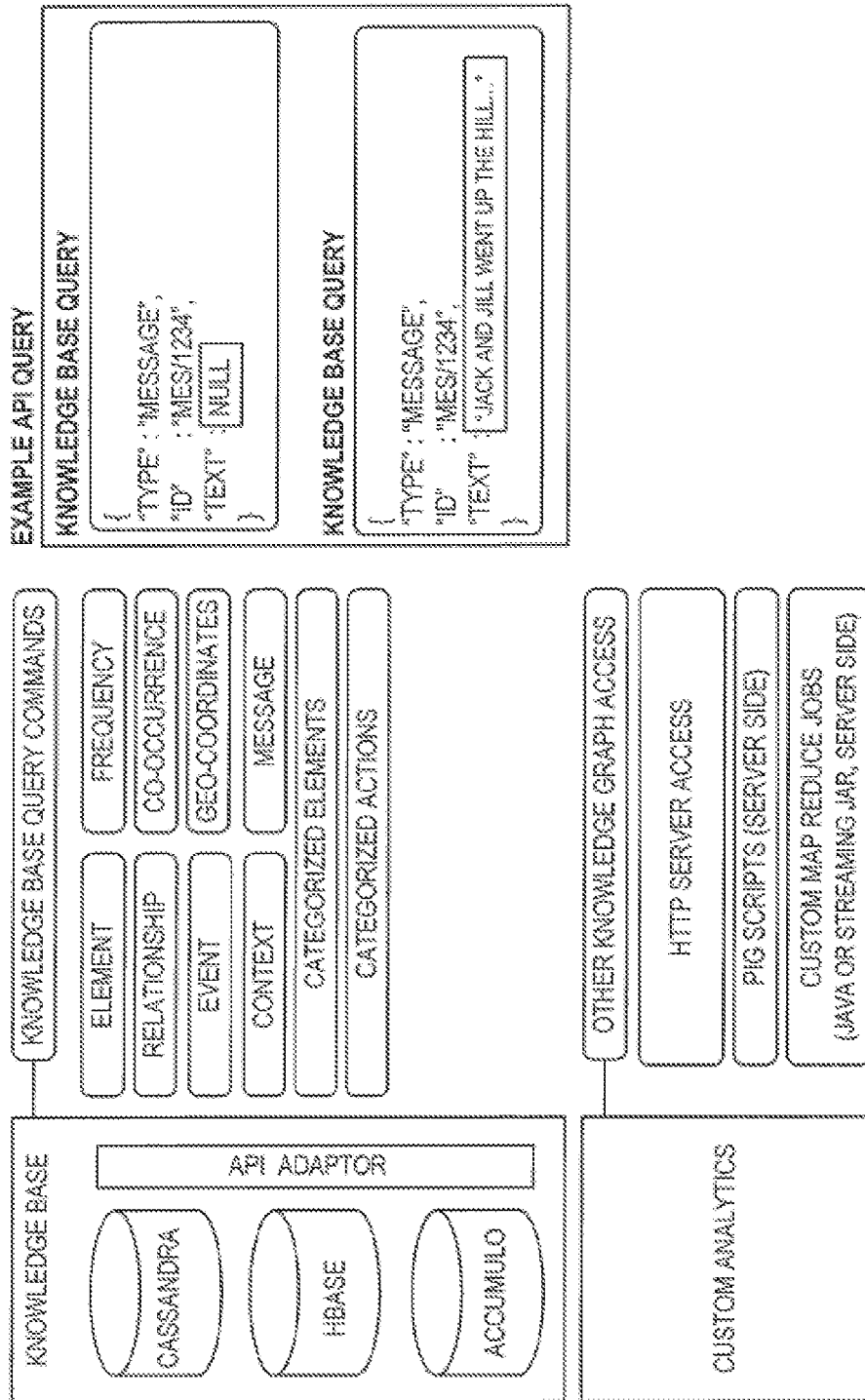
FIG. 2 is a diagram illustrating aspects of accessing data and analyses in the Knowledge Graph according to one example embodiment of the present disclosure.
Figure 3:
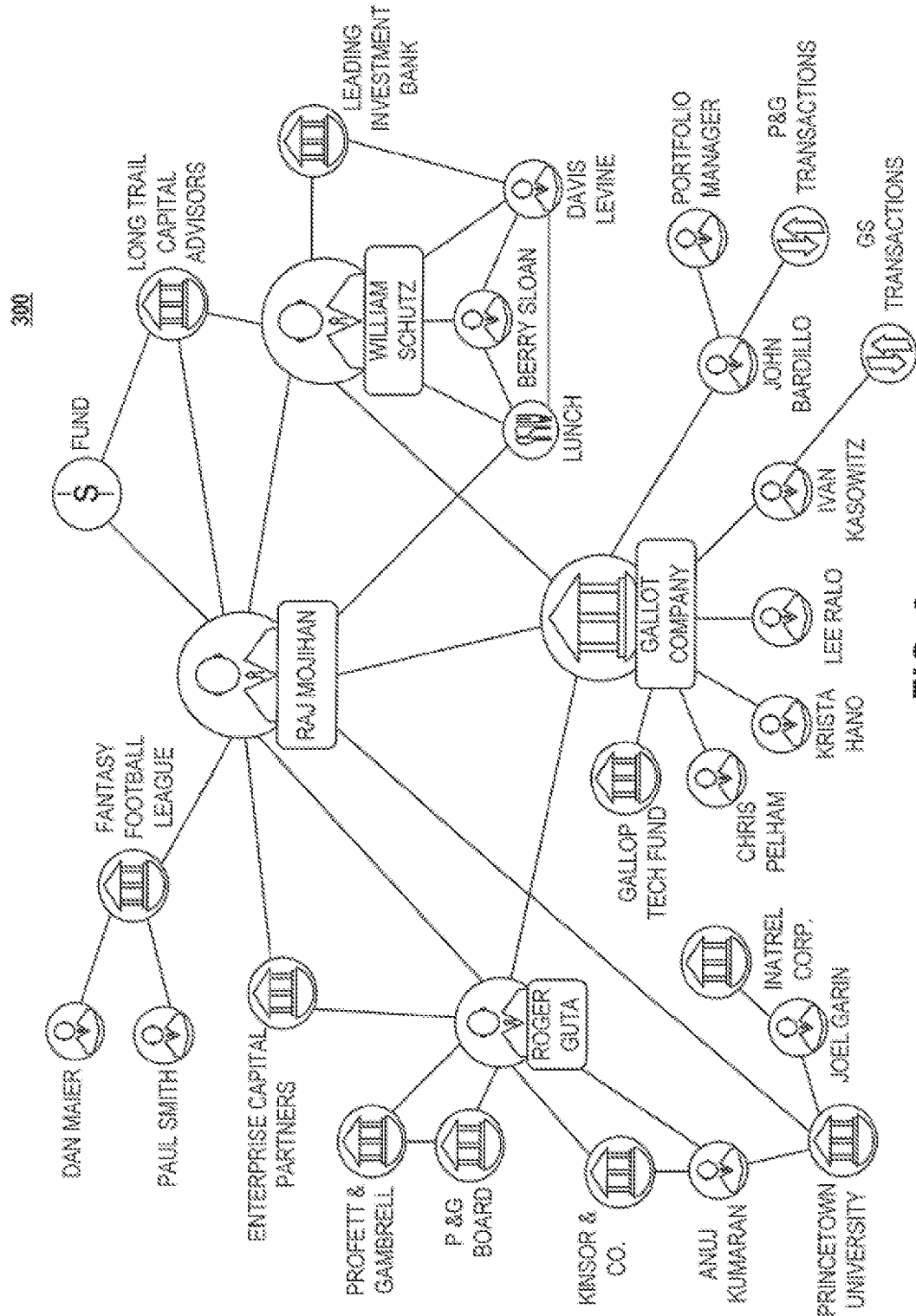
FIG. 3 illustrates information visually represented by a Knowledge Graph according to one example embodiment of the present disclosure.
Figure 4:
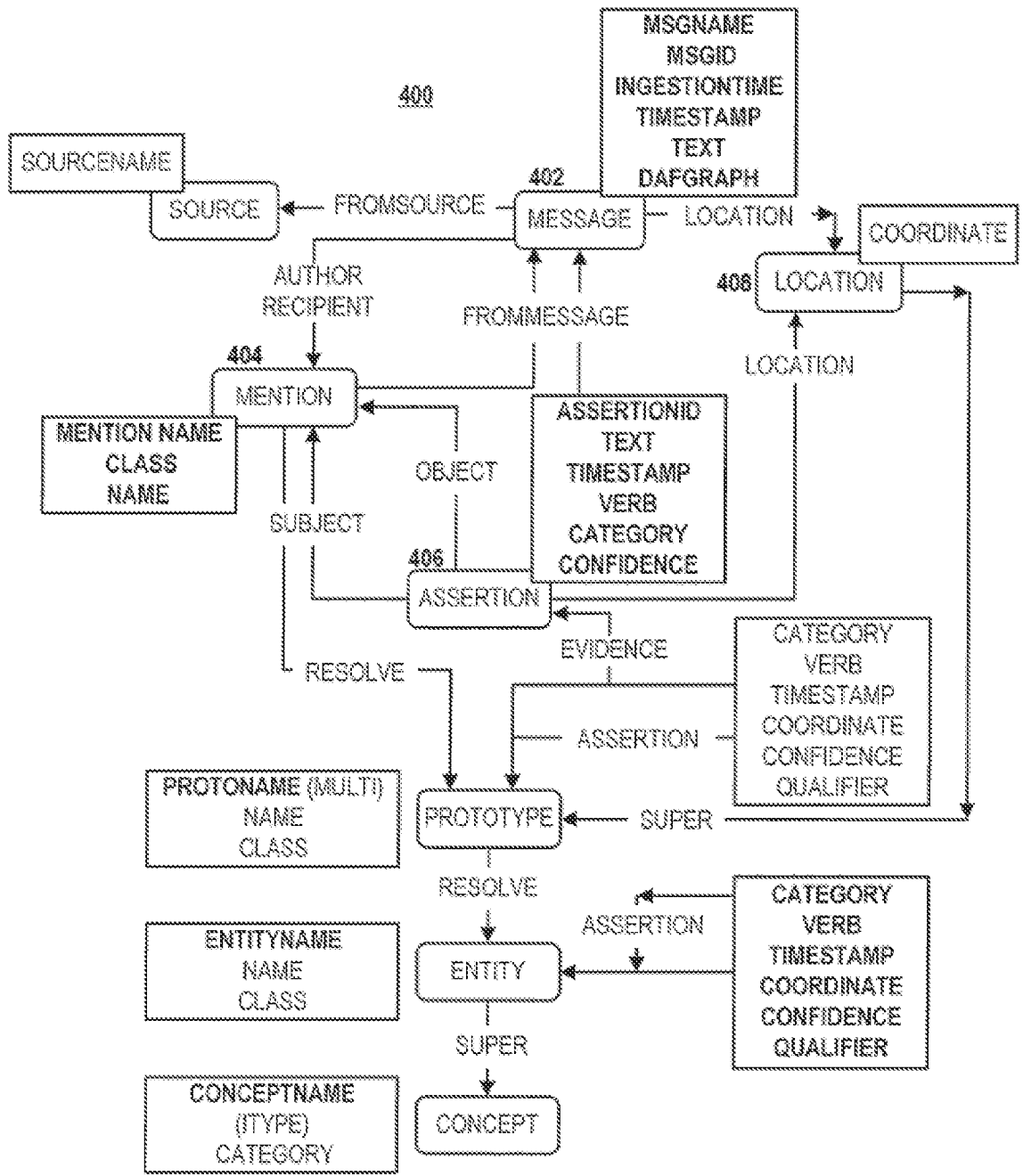
FIG. 4 illustrates organization and generation of a Knowledge Graph according to one example embodiment of the present disclosure.

The present disclosure presented herein, in accordance with some embodiments, can provide for building a graph of global enterprise knowledge from data, with integration of a set of knowledge services in the form of a rich Application Programming Interface (API) to access a "Knowledge Graph" abstracted from the data (see, e.g., FIGS. 2-4). The present disclosure in accordance with some embodiments can provide an entity-centric approach to data analytics, focused on uncovering the interesting facts, concepts, events, and relationships defined in the data rather than just filtering down and organizing a set of documents that may contain the information being sought by the user.

Now specifically referring to FIG. 1, according to some embodiments of the present disclosure, in order to assemble a rich Knowledge Graph from both unstructured data 108 and structured data 110, an analytical workflow can perform processes which may be generally described in terms of three main functional phases: "Read", "Resolve", and "Reason", where each phase includes particular functional processes. In the Read phase (see, e.g., "Read" at block 106), unstructured data 108 (e.g., web, email, instant messaging, or social media data) and structured data 110 (e.g., customer information, orders or trades, transactions, or reference data) can be ingested and natural language processing (NLP), entity extraction, and fact extraction can be performed. As non-limiting examples, unstructured data 108 may be accepted in a UTF-8 text format, and structured data 120 may be accepted in a specified XML format, among other commonly used data formats.

In the Resolve phase (see, e.g., "Resolve" at block 116), results from the Read phase can be assembled, organized, and related to perform global concept resolution and detect synonyms (e.g., synonym generation) and closely related concepts. Some aspects of the Resolve phase relate to "Resonance" as described in further detail below, which, it should be recognized, is not equivalent to "Resonate" reasoning as described herein. In the Reason phase, spatial and temporal reasoning may be applied and relationships uncovered that can allow resolved entities to be compared and correlated using various graph analysis techniques. The Reason phase can utilize "reasoners" of Global Analytics 112, where functions of Resolve 116 may be considered a type of reasoner. Reasoners can further include Resonate 114, Similarity 118, Associative Net 120, Inference 122, and Prediction 124. Various aspects of an analytical workflow that can utilize the Read, Resolve, and Reason phases may be performed in a distributed processing environment, and the results can be stored into a unified entity storage architecture which may be referred to herein as a "Knowledge Base" 126.

As illustrated in FIG. 1, systems and methods according to some embodiments of the present disclosure can utilize "Local Analytics" processes 104. Local Analytics 104 can include processes in accordance with the Read phase 106 and may refer to reading messages and enriching them with semantic annotations based on algorithms that utilize a priori models created from training and static background knowledge. Enrichment in Local Analytics 104 may use structured prediction algorithms and classification algorithms. These algorithms may be supervised or semi-supervised and can presume training of an a priori model which is evaluated at runtime. Output of Local Analytics processes 104 can include a message with the annotations populated from the analytics, which may be aggregated into an annotated message store of the Knowledge Base 126.

In conventional approaches, a problem encountered when creating and managing entity-centric information for large corpora of unstructured data is that many existing database architectures do not scale due to the large volume of entities generated and the multiple relationships that can exist between entities. To address such deficiencies, the present disclosure, in some embodiments, can provide the Knowledge Base 126 as a unified entity storage architecture that can perform at scale for both data insertion as well as data querying. In some embodiments, the Knowledge Base 126 can be a combination of persistent storage and intelligent data caching that can enable rapid storage and retrieval of entities, concepts, relationships, text documents and related metadata. This can include the text content of messages, the categorized individual tokens and semantic token groups comprising those messages and metadata such as properties, relationships and events. Such combination of rich metadata and intelligent indexing can support, among other benefits and advantages, powerful search and rapid retrieval capabilities, in addition to advanced analytical functions.

The Knowledge Base 126 can provide storage 128 and indexing 130 for annotated messages, where indexing may be passive and may not require active maintenance to support new analytics. An annotated message store can run locally (e.g., in storage 128) or can be distributed over many systems. The Knowledge Base 126 may provide for searches (see, e.g., querying 132) based on message ID, strings, any annotation value or composition of annotation values, and/or ranges of positions. The Knowledge Base 126 may additionally or alternatively contain a Knowledge Graph representation of the system as described with reference to embodiments disclosed herein, for example embodiments shown in FIGS. 1 and 5. The Knowledge Graph may be derived through Global Analytics 112, which may also be referred to as "Advanced Analytics", and may provide features to Global Analytics 112 to enable the creation of the Knowledge Graph.

System level annotations may be added to every message, such as a value hashing column that encrypts or disguises the values in the message (allowing analysis to be anonymous), and a second column can cover the visibility/access rights on data that is either populated by the metadata on the message or by the system, which may serve a dereferencing function based on a user's access privileges to the data. Annotated message storage may provide versioning for messages and updates to messages (overwrites), and may assume immutable representations of messages.

In some embodiments, Global Analytics processes 112 can take features from annotated message storage and run algorithms against aggregated (or global) metadata contained therein to produce, maintain, and enrich a unified representation of knowledge learned from the original data that may be stored in a Knowledge Graph. This may include the resolution of references yielding the creation of concepts, categories, and relationships through clustering, similarity, and ranking algorithms. At a functional level, Resolve 116 can be considered a reasoner of Global Analytics 112.

Kinds of analytic algorithms that may be used in Global Analytics 112 at a formal level can include clustering (including hierarchical), nearest neighbor, ranking, maximum a posteri (MAP) inference, and expectation maximization. The clustering, nearest neighbor, and ranking type algorithms have a family resemblance in that they can calculate relative similarity or dissimilarity between different classes or sets of objects based on features and then either return a ranked list or a partition of the objects into sets with some rationale. MAP and expectation maximization may share a family resemblance in predicting a best candidate or range of candidates given a set of condition of the Knowledge Graph at the time of evaluation.

Figure 5:
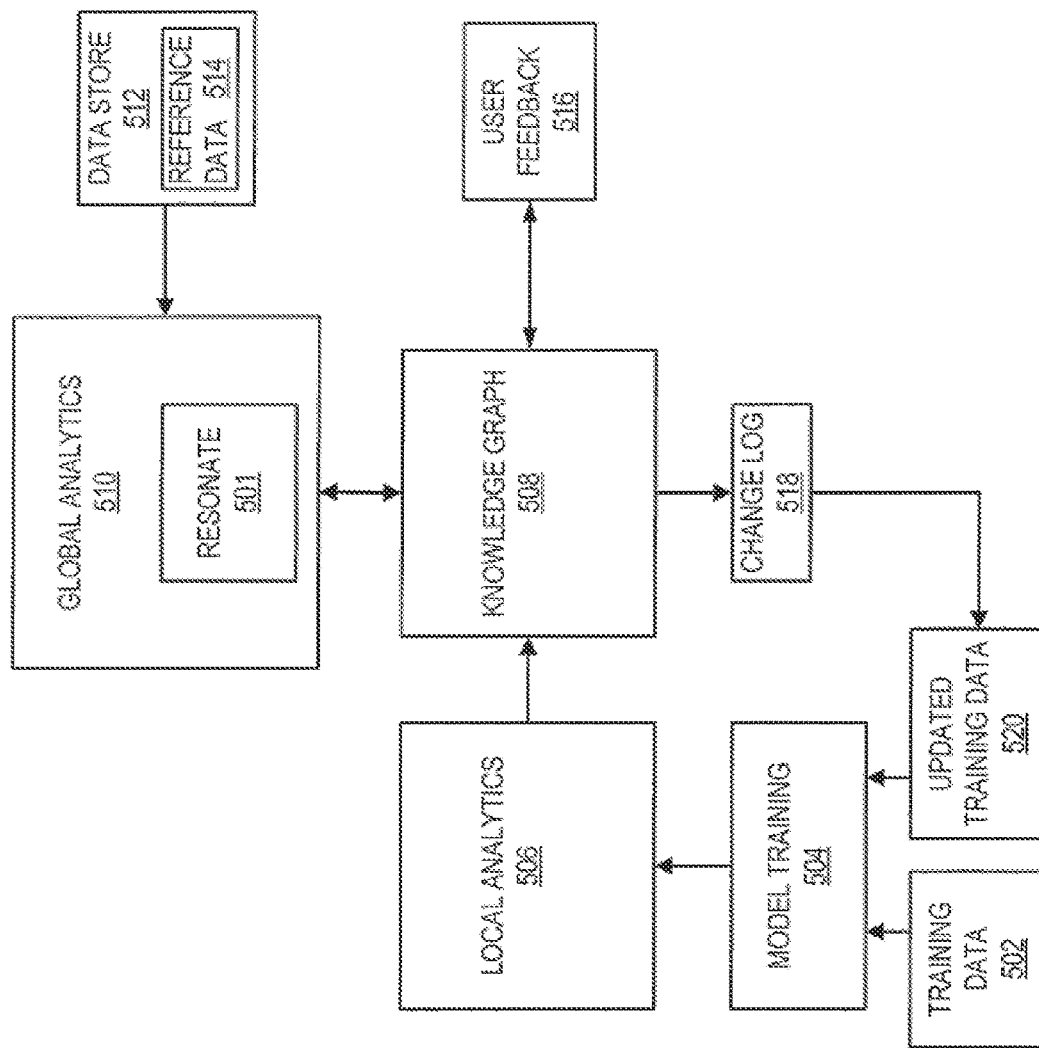
FIG. 5 is a diagram showing functional components and operation of Resonate reasoning in accordance with one or more example embodiments of the present disclosure.

As will be discussed in further detail below with respect to FIG. 5, Global Analytics 112 in accordance with some embodiments can use Resonate 114 to back-propagate from Global Analytics 112 to Local Analytics 104. For example, Resonate 114 may identify categorization errors from an extractor or named entity resolution (NER) models and back-propagate information to model training 102 to fix the errors. Resonate 114 can read from globally fixed data, generate artificial training, and teach to rebuild models, thus acting as a type of agent to perform internal training.

"Associative Net" 120 (which may also be referred to as "associative network" reasoning) in accordance with some embodiments can be based in a distributional similarity hypothesis, positing that words with similar meaning will be used in similar language constructs and contexts. Adapted to named entities, this can mean that two entities (e.g., people) that perform similar functions (e.g., occupation) can be referred to in a similar manner. For instance, it may be expected that American politicians will often appear in text near American political venues (e.g., "Washington") or in similar situations (e.g., "stump speech"). Associative Net functions according to example embodiments can leverage such an assumption to build, for each word, a compact signature that encodes all of the contexts in which it appears. The signatures for any two words can be efficiently compared to give a degree of similarity. Named entities that have a high degree of similarity according to Associative Net may often represent aliases for the same entity or other entities that serve a similar function.

Further aspects of Global Analytics 112 in accordance with some embodiments of the present disclosure can utilize "knowledge objects." Once it can be determined where (i.e., in what places) an entity has been mentioned, information can be collected about the entity from all of the mention sites. Different pieces of information can be collected from which to construct entity knowledge objects, including birth date, death date, political affiliation, and nationality. These data points can be aggregated across all of the mentions for an entity and reported as attributes of the entity. Thus, it may be observed, for example, that the entity named "Barbara Streisand" (having alias "Ms. Streisand") was born in April 1942 as long as a birth date of April 1942 could be identified for one of the mentions (e.g., "She was born in April 1942").

According to some embodiments, a distributed map framework that can be used for Local Analytics 104 can be instantiated using, for example, currently available HADOOP Map/Reduce or STORM streaming technology. This can provide for a batch data ingestion process or a streaming ingestion process (i.e., documents are fed in as they arrive in real time). According to some example embodiments, Global Analytics 112 processes can be instantiated as HADOOP Map/Reduce jobs, and this process may be executed periodically to incorporate new data being added to the Knowledge Base 126 in corpus-wide analytics processing. Global Analytics processes 112 can read data generated by Local Analytics 104 from the Knowledge Base 126, using a customized API in accordance with the present disclosure to perform bulk reads of the required data. A particularized API task performing the data reads can be instantiated as HADOOP Map/Reduce processes, for example.

Global Analytics 112 can support incremental updates such that, rather than having to reprocess an entire data corpus whenever new documents are added to the Knowledge Base 126, analytics performed on the new data can be incorporated with the analysis already contained in the Knowledge Base 126. In some embodiments, systems and/or methods can be deployed to an enterprise in a variety of configurations or can be accessed via a cloud service, which can provide for a low cost of entry while supporting a comparable level of access to analytics as an installation behind an enterprise firewall.

Now also referring to the diagram 200 of FIG. 2, according to some embodiments of the present disclosure, a number of ways can be provided for accessing the data and analysis contained in the Knowledge Base 128. A particularized API layer can enable organizations and developers to integrate aspects of the present disclosure with third party applications (e.g., business intelligence tools, search and discovery tools) or create customized user interfaces that utilize results of the analysis. These can include a set of knowledge queries via a Knowledge Base query language in accordance with the present disclosure, module commands that can provide access to specific functions performed by some modules in accordance with the present disclosure, and through IMPALA.

Utilizing IMPALA, users can query data using SQL-like syntax, including SELECT, JOIN, and aggregate functions—in real time. This can use the same metadata, SQL syntax, ODBC driver and user interface as APACHE HIVE making the transition substantially seamless when moving from APACHE HIVE to IMPALA. A Knowledge Base query language according to some embodiments may be based on the MQL specification published as part of the FREEBASE project to serve as a JSON-based (JAVASCRIPT Object Notation) query language. For web developers using JAVASCRIPT, JSON is trivially transformed into JAVASCRIPT objects so it can be particularly convenient for work in which a browser-based user interface is involved. Because the FREEBASE project's MQL usage is not mapped out as formal language, there is no set schema to be designed against.

Standard Knowledge Base query requests according to the present disclosure may include operations for standard CRUD (create, read, update, delete) operations. The Knowledge Base query engine can support create and read query types for the most common object types, with some support for update queries for specific object types. Because Knowledge Base query commands can be built on a JSON based query language, it may be intuitive to use JSON objects to specify the input parameters for this command form. The input parameters can be placed into a JSON object, and then passed to the server in the request body. The result can be passed back to the client in a JSON object with the same format as the one passed in the request body.

In accordance with some embodiments, a custom JAVA API in accordance with the present disclosure (which may also be referred to as "Reaper") can support high-performance bulk export operations on data tables in the Knowledge Base to support creation of custom analytics, data views, and data exports. It may be noted that this is not a run-time API from a specific server. These tables can be accessed from specific backend storage technology being employed, such as CASSANDRA, HBASE, or ACCUMULO. Reaper API can expose core data structures through documented business objects that conform to standard interfaces. Specifically, an input formal JAVA class can be provided for each data type supported by the interface. This input format can tell HADOOP how to break the bulk read operation into separate tasks that utilize the HADOOP Map/Reduce distributed execution environment, allowing the bulk export function to scale to the amount of available hardware in the HADOOP cluster. The Global Analytics processes can also utilize the Reaper API to read the data from the Knowledge Graph that was generated by Local Analytics processes.

According to some embodiments, in addition to searching for data, certain systems and/or methods can permit a user to get answers to questions they want to ask. Such functionality can be enabled in accordance with a high-fidelity knowledge representation predicated on a graph abstraction that can be used by people and machines to understand human language in context, which may be referred to as the Knowledge Graph. FIG. 3 illustrates an example of the type of information a generated Knowledge Graph representation 300 may contain, and the diagram 400 of FIG. 4 illustrates organization and generation of a Knowledge Graph, in accordance with some embodiments.

In some embodiments, the Knowledge Graph can be built automatically from public and private data in near real-time. A graph may be assembled with no prior knowledge of the data and can visually represent resolved entities in time and space. The entities can appear as nodes in the graph and contain aggregated knowledge about that entity (e.g., when/where they were born, when/where they went to school, and/or when/where they worked). The Knowledge Graph, according to some embodiments, can provide for understanding entities and facts in relationships that can enable a user to quickly identify specific opportunities and risks to support crucial decision-making.

As an example implementation of aspects of a Knowledge Graph according to some embodiments, if building a compliance use case, the analysis might have uncovered the following facts:
1. Roger Guta is now on the board of directors of Proffett & Gambrel.
2. Raj Mojihan is related to Roger Guta through being a former mentor of Roger.
3. Raj Mojihan is the founder of Gallot Company.
4. The Gallot Company is selling a large number of Proffett & Gambrel stock.

Other facts can also be made quickly visible, such as the common connection to Princetown University between Roger and Raj, or the connection between Roger, Raj, and William Schultz.

After reviewing these facts, an analyst may then be able to infer information based on the Knowledge Graph representations, for example:

1. Who might have shared information inappropriately or made a trade based on knowledge they shouldn't have used?
2. Does the relationship between Roger and Raj indicate a case of insider trading?

Now also referring to the diagram 400 of FIG. 4, in accordance with some embodiments of the present disclosure, the Knowledge Graph can graphically represent the information that has been extracted from a corpus, for example information extracted via one or more functions in accordance with the Read phase. A Knowledge Graph can be viewed as two separate and related sub-graphs: the knowledge sub-graph identifying the entities present in text and the relationships between them; and the information sub-graph which identifies the specific pieces of information that act as evidence/support for the knowledge sub-graph.

As illustrated in the example embodiment of FIG. 4, the information sub-graph can contain message nodes 402, mention nodes 404, assertion nodes 406, and location nodes 408. Each message node can represent a single document from a corpus and can contain metadata information about the document in addition to its text and any document-level analysis artifacts (e.g., tokenization, part-of-speech assignment, name identification) from the Read phase. These analytic outputs can be encoded within a separate graph on the "dafGraph" property of the message node.

The text of a message can refer to entities and describe various ways in which they interact. These entities can be represented in the information sub-graph by mention nodes. Each mention node can represent a coreference chain (one or more textual references to an entity) from a single document identified from the local coreference output of Read processes.

Location nodes can represent geographic references within the text that can be disambiguated and geo-coded to a specific coordinate. These location nodes can be linked to by message nodes and assertion nodes, representing the geographic locations identified in a message and the geographic locations at which individual interactions took place. Assertion nodes can represent the interactions between entities that are identified during the Read phase. Within the information sub-graph, they can be encoded as subject/verb/object triples with time and location attributes. The verb and time information can be encoded within the properties of the assertion node and the subject, object and location can be identified by edges from the assertion node to mention and location nodes (see, e.g., "subject" edge and "object" edge from assertion node 406 to mention node 404, and "location" edge from assertion node 406 to location node 408). The location node can identify the geographic location at which the interaction is thought to have occurred.

The knowledge sub-graph can aggregate individual pieces of information from messages into a corpus-global view of the information that is organized around the entity. Prototype nodes 410, entity nodes 412, and concept nodes 414 and the relationships between them can capture at a high level the individual pieces of information from the information sub-graph. The prototype nodes can represent an initial high-confidence clustering of mentions from a small portion of the corpus. A reason for this level of abstraction can be to address scale within the global coreference operation. Prototypes can aggregate mentions so that there are fewer prototypes to resolve than there are mentions. Prototypes can typically be constructed in parallel on smaller portions of a corpus. Prototypes can be linked to other prototypes by assertion edges, which can abstract the assertion nodes from the information graph. Each assertion can specify a subject and object mention node, and each of these mentions can contribute to a single prototype node. The prototype nodes corresponding to the subject and object mention nodes for an assertion can have an assertion edge between them.

Entity nodes can be considered as fundamental building blocks of the knowledge sub-graph, representing the global aggregation of information from prototype nodes. Each entity can have a link to its contributing prototypes, as well as links to the other entities in which it was been observed to interact. The assertion edges to other entities can be inherited from its prototypes. An assertion edge confidence can be aggregated from the confidence of corresponding assertion edges on contributing prototype nodes. Entities themselves can be clustered into concept nodes, representing a high level abstraction of a group of entities (see, e.g., "super" edge from entity node 412 to concept node 414).

As discussed in some detail above, an information sub-graph in accordance with some embodiments can contain message nodes, mention nodes, assertion nodes, and location nodes, wherein each message node can represent a single document from a corpus and can contain metadata information about the document in addition to its text and any document-level analysis artifacts from the Read phase. These analytic outputs can be encoded within a separate graph on the "dafGraph" property of the message node, which relates to a graph, which may relate to a "document graph", consisting of all nodes and edges that reference a common source document. A "source document" as referred to herein can be a single instance of text that is subject to analysis, such as a single file within a file system.

The nodes in a document graph can represent analytic results, features, and properties. Features and properties can be key-value pairs attached to nodes. Additionally, these nodes may have relationships to other nodes in the graph (see "edges"). For example, a node may represent a single word of text (or "token"). That node may then have a child relationship to a node representing the phrase of which the word is a part (a "chunk"). The chunk node may have other children, representing other words in the phrase. Each of these nodes may have additional properties, describing the analytic component that generated the node, a confidence associated with the node, and so on.

In some embodiments, information contained within a generated Knowledge Graph can help to answer a variety of questions relevant to specific use cases, for instance who said what to whom and/or what events are occurring when and where. Some embodiments can allow for a search that may not be otherwise easily expressed in a pre-specified analytic format, and some embodiments can provide for a user to browse the Knowledge Graph, looking for a serendipitous connection, a novel fact, or to gain situational awareness related to an entity, for instance. Some embodiments can provide for easy browsing and searching of concepts in the Knowledge Graph, by querying knowledge objects and visualizing captured information in a clean and intuitive graphical user interface, which may be web-based. In some embodiments, a user can be presented with a list of the most active concepts in their database. The user can expand the time frame and filter results by concept category, so that they are presented with, for example, a list of the people who have been the most active in the last 30 days.

When a user decides to investigate a given concept, in some embodiments an entity profile can be provided that may list key attributes such as aliases, date of birth and death, places of residence, organization memberships, titles, spouses, siblings, and/or children. The profile can also provide an interactive timeline that shows the number of times the concept is mentioned on any given date. A newsfeed can be tied to this timeline, and sentences may be displayed, where the concept appears as part of a subject-predicate-object triple during the selected period of time. Additionally, the newsfeed can display how long ago the action took place, the name of the document that reported the information, and the total number of documents that made the same statement. This news can also be filtered by predicate category, enabling the user to easily view specific types of interactions, such as communication or travel.

In some embodiments, aspects of the concept profiles can have an associated relationships tab in a graphical user interface. This visualization can identify other concepts in the Knowledge Base that are related with the current concept ordered by strength of relationship. These results can also be filtered by entity category. From the relationships tab, the user can choose to navigate to the concept's profile or a profile that documents the relationship between the two concepts. This relationship profile may primarily consist of a timeline and newsfeed showing when and how the concepts interacted over time. The user is able to interact with the news and timeline in the same fashion as on the single concept profile. Implementing certain aspects of some embodiments of the present disclosure can remove the need for a user to write their own queries to explore their data, and can provide a clean presentation of the most critical data and allow users to easily navigate the information in their systems, which can empower users to understand not just what entities in their Knowledge Bases are doing, but also how each is related to the other, including relationships that would have otherwise been nearly impossible for a human to discover on their own. Such functionality can empower organizations and individuals with a more complete understanding of their data.

Various aspects of the Read, Resolve, and Reason workflow according to some embodiments of the present disclosure will now be discussed in further detail. As described in some detail above, the Read, Resolve, and Reason phases can provide for building and exploring a graph of global enterprise knowledge. Mentions of entities can be identified during the Read phase and combined and organized into a graph of entities and relationships between them in the Resolve phase. In the Reason phase, information inherent in the Knowledge Graph can be extracted and provided as actionable insights for a user.

In some aspects of the Read phase in accordance with some embodiments, as data is read in, text of the data can first be broken up into its foundational building blocks using a multi-stage natural language processing (NLP) process. The NLP process can comprise determining sentence boundaries, then breaking up the text into "tokens." Each token can consist of a word, punctuation mark, or special character. Each token can then be analyzed and assigned a grammatical part of speech (POS) tag (e.g., proper noun, adjective, adverb). The tokens can be further analyzed to determine if adjacent tokens should be cojoined together if they describe the same concept. For example, if "John" and "Smith" were adjacent to each other, they can be co-joined to form "John Smith" as a single concept. Other types of examples can include titles or company names. This process may be referred to as chunking, which creates the elements (or entities) that can be used by downstream analytics.

A next step can be to analyze each chunk to determine if it belongs to a predefined category. Examples of categories can include people, organizations, businesses, and vehicles. A library of predefined categories may be provided. However, users may create their own custom categories using various training applications as described above.

In some embodiments, upon completion of the NLP process, the text has been broken down into its constituent parts, forming a basic foundation of contextual meaning. Using this foundation, other analytic functions can then be performed, such as identifying and cataloging significant activities (or assertions) between entities. In a grammatical sense, these can be looked at as subject-predicate-object triples, as they describe specific activities that occur between entities (e.g., a person, place, or thing). These assertions can then be categorized to describe specific types of activities, such as communications activities and/or purchase/acquisition activities.

Other analytics can include identifying and cataloging temporal and spatial references found in the text, including indirect references to time and location. For example, if the date of a document is known, a temporal reference to "next Thursday" can be assigned the correct date based on the document date.

To illustrate analytics performed by Read processes according to some embodiments, suppose that the following sentence is read in:

The Proffett & Gambrel Company today announced the appointment of Rajat Gupta, managing director of Kinsor & Company, to its board of directors.

From this sentence, the fact (assertion) that an organization named Proffett & Gambrel appointed Roger Guta to its board of directors can be identified. The date of the announcement (assertion) can be noted, as can the fact that Roger Guta was a manager director of an organization named Kinsor & Company (assertion). According to some example embodiments of the present disclosure, Read phase analytics can all be performed on a per-document basis, such that the analysis performed on the current document is not dependent on previous documents already analyzed or on future documents yet to be read.

In some embodiments, a second phase of the Read, Resolve, and Reason workflow is the Resolve phase. Analytics performed by Resolve processes can be more global in nature and span all documents processed by the Read phase. In some embodiments, Resolve can be particularly privileged to make updates, deletions, and bootstrap the full structure of the Knowledge Graph.

Entity resolution can generally refer to a process of determining whether two expressions (or "mentions") in natural language text refer to the same entity. Given a collection of mentions of entities extracted from a body of text, mentions may be grouped such that two mentions belong to the same group ("cluster") if they refer to the same entity. It may be recognized that an entity is coreferent with and refers to the same entity or that information associated with the entity is referring to multiple distinct real-world individuals. Entity resolution according to some embodiments of the present disclosure can address an existing problem of identifying the correct entity named by each mention (e.g., names, pronoun, and noun references).

Global (cross-document) coreference resolution, as disclosed herein, can leverage the local (in-document) coreference capabilities of Local Analytics. Within a single document, an entity may be referred to one or more times in what may be called a "coreference chain" (e.g., "She", "her", "Barbara", "Ms. Streisand", "famous singer"). The aggregate context (nearby words) for these mentions and other pertinent information (features) extracted from the text surrounding those mentions can form a signature for the chain. This chain signature can then be compared against chain signatures from other documents, and when a similar chain (e.g., "Barbara Streisand", "singer", "Ms. Streisand") has been identified, they can be deemed co-referent and collapsed into a larger structure containing the mentions of both. This larger group of mentions and its signature can then participate further in the comparison and combination process.

Regarding global entity resolution, across the data, a specific entity may be referred to in a number of different ways. Returning to a previous example, Roger Guta may be referred to in many different ways: Roger Guta, Rog Guta, Mr. Guta, Roger Kumir Guta, etc. Although the specific string value may be different across all of these mentions, they all refer to the same person. When doing analysis related to Roger Guta, not capturing each mention of this person due to differences in how they are referenced could adversely impact the results. According to some embodiments, contextual similarity of usage can be utilized, as can properties associated with an entity and other algorithms, to group all of these references into what can be referred to as a globally resolved concept. Without this capability, an analysis of Roger Guta may miss some very important activities related to him, as well as attribute activities to other people, when in fact they all were related to the same person.

In some example embodiments, in the Resolve phase, similar concepts can be identified based on their usage in context (e.g., synonym generation). A core premise of this analysis can be that language should be treated as a signal composed of symbols between agents. The encoding of meaning into the signal can be done through consistent selection of symbols that have stable histories of interactions (e.g., co-occurrences) within short attention ranges over a longer global history of usage related to these symbols. The pattern of usage of a particular entity, taken globally, can form a signature. Entities that have similar usage patterns or signatures can be related semantically. Algorithms used to perform this analysis can provide a mathematical formalization and computation for that notion of similarity. This analysis can be useful for identifying both explicit and implicit relationships between people or other entities. For example, the name of a world leader can be semantically related to other world leaders. Thus, if searching for concepts similar to Barack Obama, other people such as Vladimir Putin, Angela Merkel, and David Cameron may be returned, because they all share the concept of being world leaders.

Continuing an illustration from discussions above, the entity resolution analysis according to some embodiments of the present disclosure may uncover some additional facts about Roger Guta, such as the fact that the Roger Guta mentioned in the announcement of the P & G board appointment is the same Roger Guta who serves on the board of a leading investment bank. The similarity analysis may uncover that Roger Guta's former mentor is Raj Mojihan, who also is the founder of Gallot Company. Other additional facts, such as Roger Guta being born in 1956 and graduating from Princetown University, would also be added to our understanding of the concept of "Roger Guta".

In some embodiments, a third phase of the Read, Resolve, and Reason workflow is Reason. Functions of the Reason phase of analysis can operate to understand and correlate all of the information discovered in the prior two phases to include important people, places, events, and relationships uncovered in the data. According to some embodiments, this can be accomplished by amplifying human intelligence through a variety of algorithms to manipulate the collection of concepts and relationships that ultimately help end users answer questions.

In accordance with some embodiments, reasoning processes (Reason phase) may refer to the use or manipulation of concepts and relationships to answer end user questions. Reasoning may be primitive (atomic) or complex (orchestrated to support a specific business use case). The following are some examples of types of reasoning (sometimes expressed herein in terms of respective "reasoners") that can be used to amplify human intelligence, in accordance with some embodiments.

"Connectivity" reasoning can relate to, given a set of features, using an operator to test for linkages between concepts, relationships, or messages. "Similarity" reasoning (see, e.g., "Similarity" at block 118 of FIG. 1) can relate to, given a set of features, using an operator to compare concepts, relationships, or messages and generate a ranked order. A model thereby may relate to having a selection of features wherein a component of the system performs the weighting of features based on statistics associated with a global graph. A constraint of Similarity can be modular such that one kind of similarity algorithm can be chosen over others that may function together as a kind of composite function.

"Temporal and Spatial" reasoning can relate to the assignment of space (locale) and time as a set of ranges used to constrain relationships and resolved entities. "Frequency and Trending" reasoning can relate to, given a set of features, using an operator to generate counts of concepts, relationships, or messages that satisfy constraints such as occurrence over time and (optionally) space.

"Pattern and Anomaly Detection" reasoning can relate to, given a set of features, using an operator to test for the existence of, or a change in, the historical state or expectation of a concept, relationship, or message and detect and notify a user of matches. For example, Pattern and Anomaly Detection reasoning can be used to analyze a past calendar week to determine what users are starting to interact as a group (in the data) that have never interacted with each other before. Also, this type of reasoning can be used to look for new users that are starting to interact with together. The corresponding data may then be tagged for identification as an emerging group or emerging idea, thus adding to the representation.

"Anomaly" reasoning as used herein can generally be defined as a delta or deviation in an expectation of certain primitives in the Knowledge Graph. An Anomaly reasoner can be constantly calculating against a certain set of entities, types of entities, and looking for any deviation that is above the expectation beyond some constraint. In an exemplary implementation relating to communication between two parties, one party may start communicating with a party outside of a company and potentially giving away, in an unauthorized sense, privileged information. If the one party is communicating with someone new that they previously did not communicate with, this can be considered a deviation, as can two parties discussing subjects that are normally not part of their ordinary conversations, or where two parties that had a long-term relationship in the past suddenly end communication.

"Grouping" reasoning can relate to, given a set of features, using an operator to partition or separate a collection of concepts, relationships, or messages into sets. Anticipation and "Prediction" reasoning (see, e.g., "Prediction" at block 124 in FIG. 1) can relate to, given a set of features, using an operator to estimate future values of concepts, relationships, or messages. "Inference" reasoning (see, e.g., "Inference" at block 122 in FIG. 1) can relate to, given a set of features, using an operator to generate new, non-explicit connections between concepts, relationships, or messages through inductive, deductive, and abductive logic (absolute or probabilistic). "Influence" reasoning can relate to a measurement of an effect of entities or objects to one another in the Knowledge Graph.

Now referring to FIG. 5, aspects of Resonate according to some embodiments of the present disclosure will be described in further detail. Resonate in accordance with the embodiment shown in FIG. 5 may perform the functions of Resonate 114 shown in FIG. 1, as well as further functions described below. As shown in the diagram 500 of FIG. 5, Resonate (generally represented by block 501) in accordance with some embodiments can provide a way of back-propagating learning from Global Analytics 510 to Local Analytics 506. It should be recognized that Global Analytics 510 and Local Analytics 506 as discussed herein can comprise some or all of the functionality of Global Analytics 112 and Local Analytics 104 as discussed above with respect to the embodiment shown in FIG. 1. In some embodiments, Resonate can identify an error resulting from a statistical language model trained using training data 502 and cause a model training process 504 to correct the error and produce corrected, updated training data 520. The error may be an error that occurred when predictively annotating certain text data to have a particular value or label, for example a categorization error from named entity recognition models. The annotations may be semantic annotations to text data, for creating annotated messages by generating, at least in part by a trained statistical language model, predictive labels that correspond to part-of-speech, syntactic role, sentiment, and/or other language patterns associated with the text data.

In one embodiment, Resonate can identify the errors at a global level in a Knowledge Graph 508 through Global Analytics reasoners such as Resolve (see, e.g., Resolve 116 at FIG. 1 and corresponding description above). Resonate can update the respective data (e.g., annotation label, value) to be accurate and consistent, record the changes in a change log 118, and then back-propagate the corrected data into training information used by supervised model training at 504, thereby improving the accuracy of future predictions.

Resonate can read from globally fixed data, generate artificial training, and teach to rebuild models. In some embodiments, certain functions of Resonate can be implemented through the use of an autonomous trainer agent that performs internal training, which is a different modality of training as compared to supervised training by a human analyst that annotates and corrects model results. In example embodiments, end users can provide input 516 ("user feedback") to correct values and relationships in the Knowledge Graph 508 via a user interface such as a graphical user interface, to provide for user feedback-driven correction of the Knowledge Graph 508. These corrections may be recorded in the change log 518. If multiple users make changes, then different change logs may be reconciled through an administrative process whereby a user with particular permissions and authorities to make changes to the Knowledge Graph 508 can determine and select the best and/or most accurate updates and make them canonical. It should be appreciated that the changes are not limited to being made by human users, and may be made using a reasoner or other automated statistical process as described herein with respect to certain embodiments. Having made the updates to the Knowledge Graph 508, these changes can be recorded in the change log 518 and back-propagated into new training data 520 for supervised model training processes at 504 and yield more accurate prediction from the output of Local Analytics 506.

In some embodiments, well-vetted (high confidence) reference data 514 from back end storage 512 can be ingested (e.g., via an ingestion engine, not shown) and treated with similar authority as end user feedback, by overriding values that were derived from the Knowledge Graph 508 and replacing those values with appropriate values from the reference data 514, which may be at the discretion of a system administrator. The reference data 514 may include customer lists, ontologies, lists of businesses, and/or census information about various people. The updated values from the Knowledge Graph 508 can once again be back-propagated into updated training data 520 for supervised model training processes at 504 and yield more accurate prediction from the output of Local Analytics 506.

In some embodiments, with every update from any one of the above initial sources, improvements in Local Analytics models can result. These Local Analytics models correspond to models created using the updated training data 520, whereas the previous state of the models prior to the alteration and/or improvements to the training data would be a model created using prior training data 502. A new model created using the updated training data 520 can yield higher quality features and annotations on individual messages that are utilized by other Global Analytics reasoners to thereby improve the quality of their outputs, which include aggregates and sets of concepts, relationships, and other key objects in the Knowledge Graph 508. These improvements mean that the outcomes of Global Analytics functions such as resolution functions performed by Resolve reasoners (see, e.g., Resolve 116 in FIG. 1 and corresponding description above) will improve and therefore yield additional corrections for training information.

Therefore, the implementation of Resonate functionality in accordance with some embodiments can provide for an ongoing loop that continually improves the quality of the Knowledge Graph. As such, it effectively allows for a virtuous circle of improving data. This ongoing loop of Resonate can be performed indefinitely, for a certain predefined number of iterations, or until a certain predefined level of accuracy in annotations or other metrics is reached or exceeded, for example a threshold level of accuracy and/or based on a predetermined amount of error tolerance.

Certain user-defined reasoners, in accordance with some embodiments, can perform functions such as social network identity resolution to outside structured data (consumer data) and/or recommend in news stories based on interests of a user. User-defined reasoners may also include reasoners for determining user influence on particular issues, by mapping probability of an assertion to propagate in the Knowledge Graph from a target network, based on a profile of the user and characterization of the assertion. User-defined reasoners may also relate to changes in user opinion over time, and assertion factorization of user opinion, which is associated with messages/assertions that may trace/drive current makeup of popular assertions. Additionally, user-defined reasoners may also relate to user-profile completion/inferencing. As an illustrative example: "I know X, Y about person A. I know they are most like persons B & C who have property as True . . . with what confidence can I assume property Z is true of A". User-defined reasoners can also identify emerging influencers (change in influence over time), relating to people, issues, and messages/assertions. In some embodiments, one or more reasoners described above that apply to social media data plus linked textual content may be used. A Knowledge Graph of properties and beliefs can be created from analyzing streams of conversation and metadata and projecting it over geography and over time.

Various types of reasoners can be system-level reasoners residing in Resolve, which can be system privileged. Types of reasoners may also relate to a taxonomy of categories that can be able to analyze "activities", for example world leaders that have "meetings". As an example illustration, inanimate objects like chairs or televisions do not have meetings, but generally all people have meetings; some world leaders occupy an "office" in the government and others such as corporate executives do not. Some types of reasoners may also relate to ontology of relationship clusters between induced categories.

Each of the above-described Reasoning capabilities can be used in ensemble to enable complex reasoning capabilities such as social network analysis and sentiment analysis. As an example, for social network analysis, an application may use Connectivity, Grouping, and Frequency and Trending reasoning to show high level patterns and affinities among individuals and groups. As another example, for sentiment analysis, Connectivity and Grouping reasoning that leverage categorized modifiers as features can yield positive or negative sentiment detection and scoring about various concepts in the system.

As the Knowledge Graph becomes progressively richer, earlier performed decisions, for example as performed in the Read phase, may be overridden by a reasoner. Whereas processes in the Read phase may be limited to one document at a time, what knowledge was in the one document, and what knowledge was in the model it was trained from, a reasoner, on the other hand, may have knowledge of all the global data and can make corrections to errors. For example, reasoners may have access to knowledge to correct an earlier mistake wherein three instances of the same person led to the entity being identified as an organization rather than a person. Accordingly, reasoners can have the privilege and ability to override the mistake.

Aspects of Resonance according to some embodiments of the present disclosure can include streaming concept resolution. In streaming concept resolution, when a state of a model has been built, with an initial state through global co-reference/global concept resolution, streaming resolution is enabled such that, as data is coming in, fast discrimination decisions may be performed as to where a given entity should be placed. Using stored conditional random field models, decoding is performed, which includes making a best judgment, like a maximum a posteri probability judgment of what class a given stream belongs in, such as a person or location. When a decision is made on the type of entity in the Read phase, a feature vector can be created around that particular set of tokens to make that decision. Outputs from the streaming concept resolution, from a sort of per-message stage with each entity, can put those into the right initial configuration after an initial configuration has been set up. As such, a signature of an entity can be best matched to previously resolved entities as the data comes in. The system may run in a batch mode in the background. An example implementation can monitor a news feed in another country in real-time as pivotal events unfold.

Figure 6:
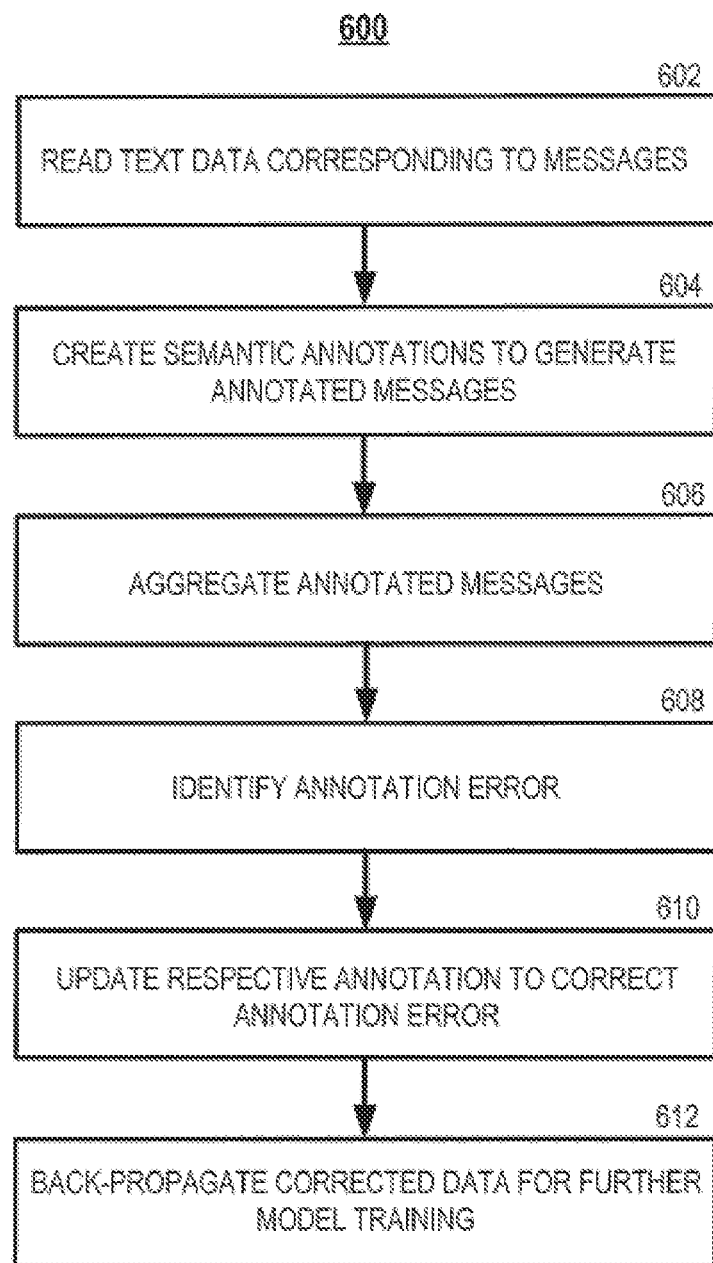
FIG. 6 is a flow diagram illustrating operations of a method for performing functions of Resonate reasoning in accordance with one example embodiment of the present disclosure.

FIG. 6 is a flow diagram illustrating operations of a method 600 for performing functions of Resonate reasoning in accordance with one embodiment of the present disclosure. At operation 602 of the method 600, text data is read which corresponds to one or more messages. Next, at operation 604, semantic annotations to the text data are created to generate one or more annotated messages. At operation 606, the annotated messages are aggregated and information associated with the aggregated messages is stored in a message store. At operation 608, one or more annotation errors are identified in the semantic annotations, and at operation 610, the respective semantic annotations are updated to correct the annotation errors. At operation 612, corrected data corresponding to the updated semantic annotations are back-propagated into training data for further language model training.

Figure 7:
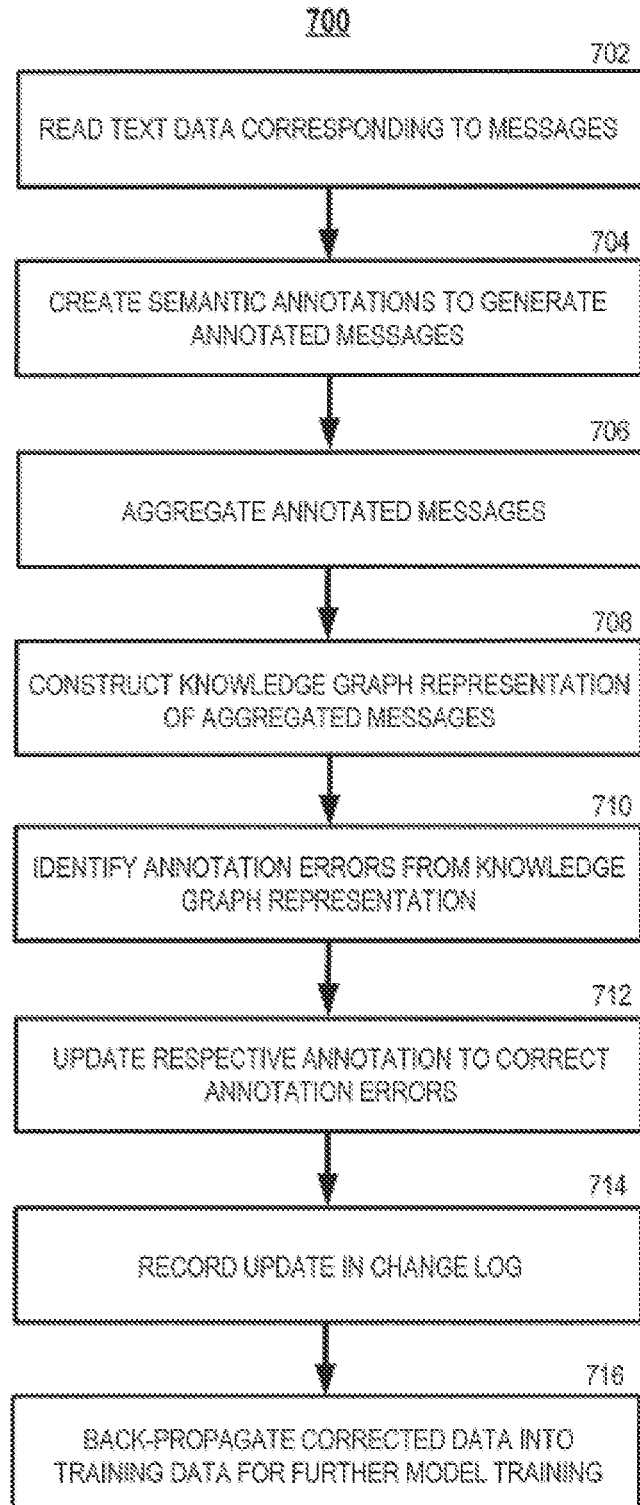
FIG. 7 is another flow diagram illustrating operations of a method for performing functions of Resonate reasoning in accordance with one embodiment of the present disclosure.

FIG. 7 is a flow diagram illustrating operations of a method 700 for performing functions of Resonate reasoning in accordance with one embodiment of the present disclosure. At operation 702 of the method 700, text data is read that corresponds to one or more messages. The text data can include natural language content and/or metadata. At operation 704, one or more semantic annotations to the text data are created to generate one or more annotated messages. Creating the semantic annotations can include generating, at least in part by a trained statistical language model, one or more predictive labels corresponding to language patterns associated with the text data. The language patterns can include part-of-speech, syntactic role, and/or sentiment associated with the text data. At operation 706, the annotated messages are aggregated and information associated with the aggregated messages is stored in a message store.

The message store can be configured to provide for data insertion and/or data querying for entities, concepts, relationships, and/or metadata associated with the messages.

At operation 708, a knowledge graph representation of the aggregated messages is constructed. At operation 710, one or more semantic annotation errors are identified, and at operation 712, the one or more respective semantic annotations with the annotation errors are updated to correct the errors. Identifying the errors and updating the respective annotations (operations 710 and 712) can include identifying the annotation errors from the knowledge graph representation and updating the respective annotations in the knowledge graph representation. Identifying the annotation errors from the knowledge graph representation and updating the respective annotations can additionally or alternatively include receiving an annotation correction from one or more users via a user interface.

Identifying the annotation errors (operation 710) can include identifying a categorization error from a named entity recognition (NER) model. Updating the respective annotations (operation 710) can include overriding values derived from the knowledge graph representation based at least in part on values from predetermined information in structured reference data. At operation 714, the update to the annotations is recorded in a change log, and operation 716, corrected data corresponding to the corrected annotations is back-propagated into training data for further training of the statistical language model. Updating the respective annotations (operation 712) and/or back-propagating the corrected data (operation 716) can be performed by an autonomous trainer agent. The process of identifying, updating, recording, and back-propagating can be performed repeatedly until a predetermined level of accuracy of the annotations has been reached and/or a predetermined number of iterations have been performed.

Figure 8:
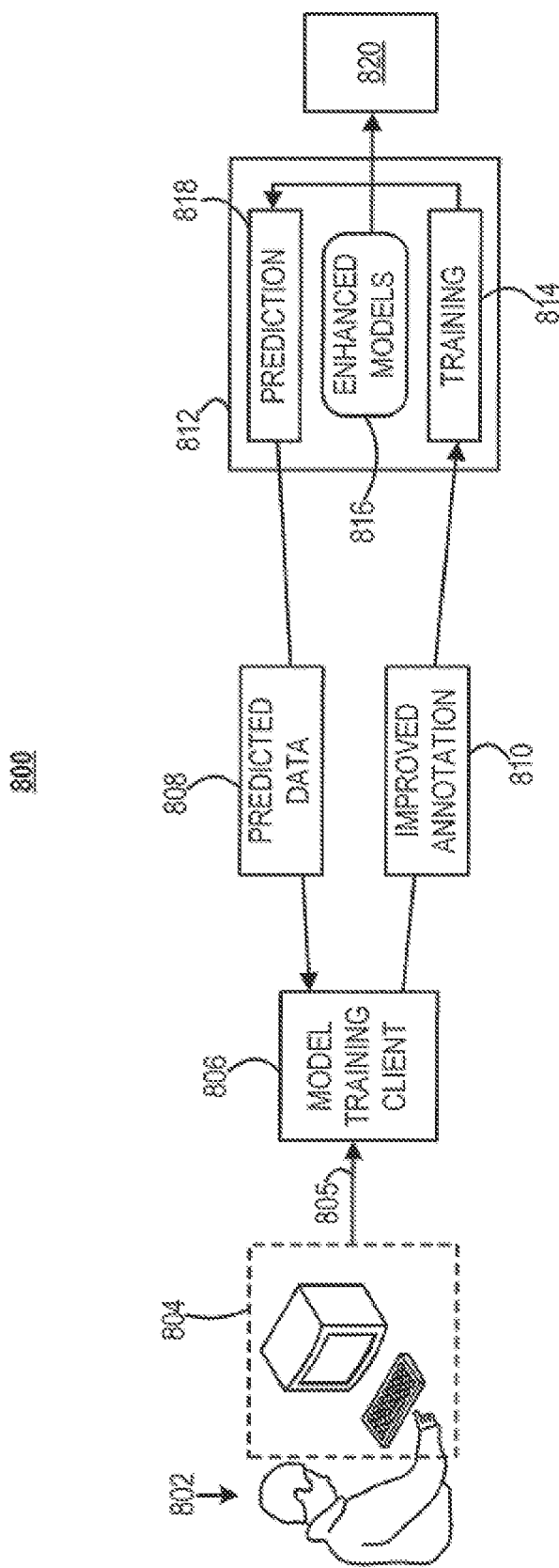
FIG. 8 illustrates an exemplary system for machine learning capable of implementing one or more example embodiments of the present disclosure.

FIG. 8 is a diagram illustrating architecture of an exemplary system 800 for machine learning in which one or more example embodiments described herein may be implemented. As shown, the system 800 includes a user computer 804 operated by a user 802. The user computer 804 can include some or all of the components of the computer 900 shown in FIG. 9 and, described in further detail below. By interacting with a user interface (e.g., graphical user interface) of the user computer 804, the user 802 may perform, via a model training client 806, functions associated with model creation and/or model training according to some embodiments described herein.

Generated models such as enhanced models 816 may be provided to other applications or components (collectively represented by reference numeral 820) for performing various natural language processing (NLP) functions at other locations in a larger system and/or using resources provided across multiple devices of a distributed computing system. A user interface executing on the computer 804 (e.g., graphical user interface) may be configured to receive user input 805 related to, for example, text annotation functions associated with some embodiments described herein.

The improved annotation 810, training 814, prediction 818, and predicted data 808 operations may be managed via the model training client 806. Training 814, prediction 818, and storage of enhanced models 816 can be implemented on another computer 812, which may be locally or remotely coupled to and in communication with user computer 804, via a communication link such as a wired or wireless network connection. The computer 812 may include some or all of the components of the computer 900 shown in FIG. 9. A base model may be improved by closing the feedback loop, where the data may include tokenization, part-of-speech (POS) tagging, chunking, and/or name entity recognition ("NER") annotation, for example.

In some embodiments, a base model may be used to predict annotations to a first segment of text. Users such as data analysts or linguists may then correct the annotation predictions. The resulting corrected data may then be used to train a new model based on just the corrections made to the predictions on the first segment of text. This new model may then be used to predict annotations on a second segment of text. The corrections made to predictions on the second segment of text may then be used to create a new model and predict annotations on a third segment of text, and so on accordingly. This prediction, annotation, and training process may progressively improve a model as additional segments of text are processed.

Figure 9:
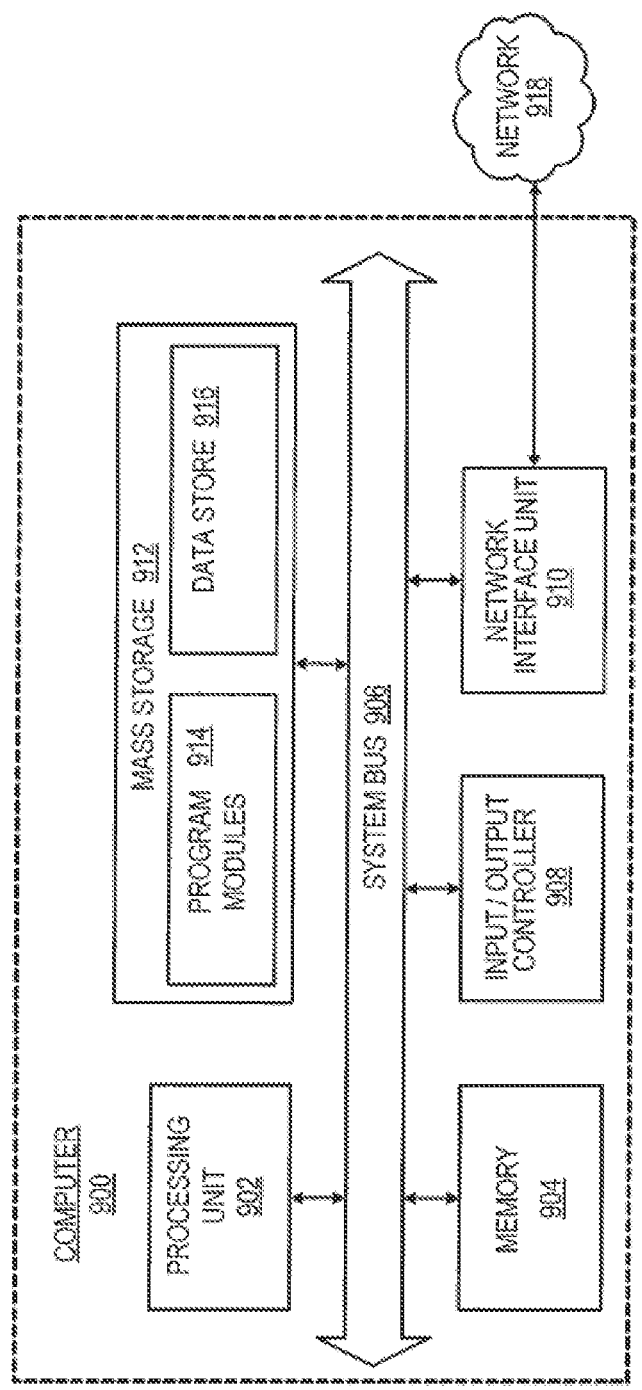
FIG. 9 is a computer architecture diagram illustrating an exemplary computer hardware architecture for a computing system capable of implementing one or more example embodiments of the present disclosure.

FIG. 9 is a computer architecture diagram showing a general computing system capable of implementing one or more embodiments of the present disclosure described herein. A computer 900 may be configured to perform one or more functions associated with embodiments illustrated in one or more of FIGS. 1-8. It should be appreciated that the computer 900 may be implemented within a single computing device or a computing system formed with multiple connected computing devices. For example, the computer 900 may be configured for a server computer, desktop computer, laptop computer, or mobile computing device such as a smartphone or tablet computer, or the computer 900 may be configured to perform various distributed computing tasks, which may distribute processing and/or storage resources among the multiple devices.

As shown, the computer 900 includes a processing unit 902, a system memory 904, and a system bus 906 that couples the memory 904 to the processing unit 902. The computer 900 further includes a mass storage device 912 for storing program modules. The program modules 914 may include modules executable to perform one or more functions associated with embodiments illustrated in one or more of FIGS. 1-8. For example, the program modules 914 may be executable to perform functions for Local Analytics reasoning, Global Analytics reasoning, model training, and/ or construction and maintenance of a Knowledge Graph as described above with reference to the embodiments shown in FIGS. 1 and 5. The mass storage device 912 further includes a data store 916, which may be configured to function as, for example, the Knowledge Base and/or message store described above with respect to the embodiments shown in FIGS. 1 and 5.

The mass storage device 912 is connected to the processing unit 902 through a mass storage controller (not shown) connected to the bus 906. The mass storage device 912 and its associated computer storage media provide non-volatile storage for the computer 900. By way of example, and not limitation, computer-readable storage media (also referred to herein as "computer-readable storage medium") may include volatile and non-volatile, removable and non-removable media implemented in any method or technology for storage of information such as computer-storage instructions, data structures, program modules, or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 900. Computer-readable storage media as described herein does not include transitory signals.

According to various embodiments, the computer 900 may operate in a networked environment using connections to other local or remote computers through a network 918 via a network interface unit 910 connected to the bus 906. The network interface unit 910 may facilitate connection of the computing device inputs and outputs to one or more suitable networks and/or connections such as a local area network (LAN), a wide area network (WAN), the Internet, a cellular network, a radio frequency network, a Bluetooth-enabled network, a Wi-Fi enabled network, a satellite-based network, or other wired and/or wireless networks for communication with external devices and/or systems. The computer 900 may also include an input/output controller 908 for receiving and processing input from a number of input devices. Input devices may include, but are not limited to, keyboards, mice, stylus, touchscreens, microphones, audio capturing devices, or image/video capturing devices. An end user may utilize such input devices to interact with a user interface, for example a graphical user interface, for managing various functions performed by the computer 900.

The bus 906 may enable the processing unit 902 to read code and/or data to/from the mass storage device 912 or other computer-storage media. The computer-storage media may represent apparatus in the form of storage elements that are implemented using any suitable technology, including but not limited to semiconductors, magnetic materials, optics, or the like. The program modules 914 may include software instructions that, when loaded into the processing unit 902 and executed, cause the computer 900 to provide functions associated with embodiments illustrated in FIGS. 1-8. The program modules 914 may also provide various tools or techniques by which the computer 900 may participate within the overall systems or operating environments using the components, flows, and data structures discussed throughout this description. In general, the program module 914 may, when loaded into the processing unit 902 and executed, transform the processing unit 902 and the overall computer 900 from a general-purpose computing system into a special-purpose computing system.

The processing unit 902 may be constructed from any number of transistors or other discrete circuit elements, which may individually or collectively assume any number of states. More specifically, the processing unit 902 may operate as a finite-state machine, in response to executable instructions contained within the program modules 914. These computer-executable instructions may transform the processing unit 902 by specifying how the processing unit 902 transitions between states, thereby transforming the transistors or other discrete hardware elements constituting the processing unit 902. Encoding the program modules 914 may also transform the physical structure of the computer-readable storage media. The specific transformation of physical structure may depend on various factors, in different implementations of this description. Examples of such factors may include, but are not limited to: the technology used to implement the computer-readable storage media, whether the computer-readable storage media are characterized as primary or secondary storage, and the like. For example, if the computer-readable storage media are implemented as semiconductor-based memory, the program modules 914 may transform the physical state of the semiconductor memory, when the software is encoded therein. For example, the program modules 914 may transform the state of transistors, capacitors, or other discrete circuit elements constituting the semiconductor memory. As another example, the computer-storage media may be implemented using magnetic or optical technology. In such implementations, the program modules 914 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present disclosure.

Although some embodiments described herein have been described in language specific to computer structural features, methodological acts and by computer readable media, it is to be understood that the disclosure defined in the appended claims is not necessarily limited to the specific structures, acts or media described. Therefore, the specific structural features, acts and mediums are disclosed as exemplary embodiments implementing the claimed disclosure.

It is to be understood that the mention of one or more steps of a method does not preclude the presence of additional method steps or intervening method steps between those steps expressly identified. Steps of a method may be performed in a different order than those described herein. Similarly, it is also to be understood that the mention of one or more components in a device or system does not preclude the presence of additional components or intervening components between those components expressly identified.

The various embodiments described above are provided by way of illustration only and should not be construed to limit the scope of the present disclosure. Those skilled in the art will readily recognize various modifications and changes that may be made without following the example embodiments and applications illustrated and described herein and without departing from the true spirit and scope of the disclosure as set forth in the appended claims.

What is claimed is:

1. A computer-implemented method, comprising:
receiving text data that comprises at least unstructured data and wherein the text data is associated with a plurality of messages communicated between a plurality of entities;
determining relationships between the entities, based on the text data associated with the plurality of messages;
generating, from a knowledge base assembled from at least the text data, a response to a user interaction representing a query for information that corresponds to at least one of the entities and indicates information on one or more of the determined relationships between the entities; and
receiving, through a user interface, at least the user interaction, wherein the user interface is configured to, in response to the user interaction, provide at least one of browsing and searching functions for the information in the knowledge base that corresponds to the at least one of the entities and that includes the information on one or more of the determined relationships between the entities;
wherein the determining of the relationships between the entities, based on the text data associated with the plurality of messages, comprises:
detecting a deviation in communication between the entities that indicates unauthorized disclosure of information between a first entity and a second entity, and wherein the deviation in communication comprises at least one of:
the first entity communicating one or more messages with the second entity wherein the first entity and second entity had not previously communicated messages;
the first entity communicating one or more messages with the second entity that include discussion of a subject that was not previously discussed in messages between the first entity and the second entity; and
the first entity and the second entity ending communication after an established history of the first entity communicating messages with the second entity.

* * * * *